Patented Dec. 1, 1953

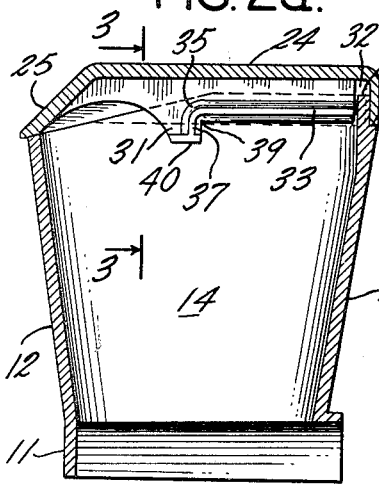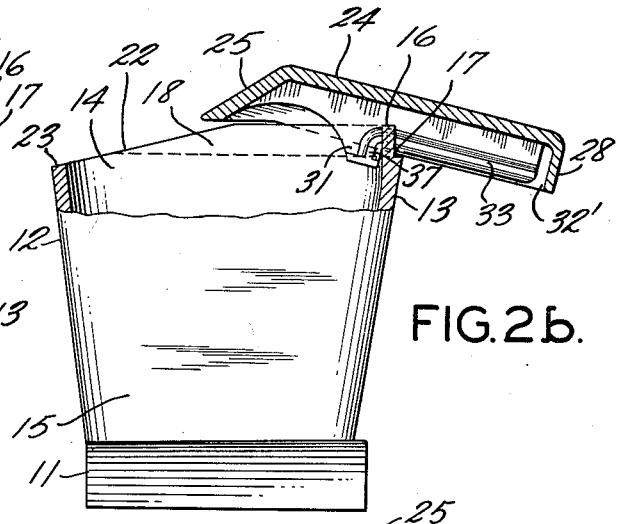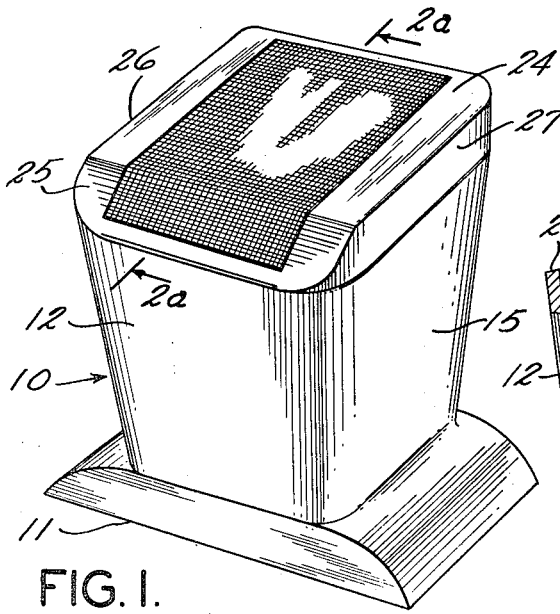

2,661,119

UNITED STATES PATENT OFFICE 2,661,119

CONTAINER AND CLOSURE THEREFOR

Newton E. Spiess, Jr., Oakdale, Islip, and Edward M. Gropen, East Northport, N. Y., assignors to National Dairy Research Laboratories, Inc., Oakdale, Islip, N. Y., a corporation of Delaware Application September 24, 1952, Serial No. 311,222

7 Claims. (Cl. 220—38)

The present invention relates to lids for hoppers and other containers and embodies, more specifically, an improved form of lid by means of which material may be supplied to these devices conveniently from time to time as it becomes necessary to do so in the operation thereof.

As is commonly known, apparatus for beating, whipping, grinding, and performing like operations upon foodstuffs and similar substances are generally provided with hoppers by means of which such substances may be fed into these devices for processing where the use of these devices generally involves batch operations or operations of a non-continuous character. In the operation of these devices it frequently becomes desirable to provide covers or lids for the hoppers and, where the material being processed involves a food product, it is desirable to form the structure in such fashion that it may be easily cleaned and readily operated.

The present invention deals with devices of the above character, the use of which involves the processing of food products and relates more particularly to apparatus for the beating or whipping of materials, such as ice cream, in order that the end product may be of a soft and fluffy nature such as is generally referred to as "soft ice cream." Where soft ice cream is dispensed, it is customary to convert it into the soft state as it is dispensed, and this quite naturally is accomplished at soda fountains and like points of distribution of products of this character. In these locations the convenience of operation is of extreme importance as well as the requirement that the device be sanitary and susceptible of easy cleansing.

An object of this invention, accordingly, is to provide a cover or lid for hoppers of devices of the above character wherein the cover is so secured to the hopper that it will not ordinarily become detached therefrom and yet may be moved from its open and closed positions, respectively, to its closed and open positions with facility.

Yet another object of this invention is to provide a lid or cover structure of the above character which may be readily and effectively operated by one hand or by a simple motion of a part of the hand or wrist in order that the operator's hands may be otherwise utilized in connection with the requirements of the service he is performing.

The foregoing objects are attained by the provision of a cooperating lid and hopper structure wherein the lid is slidably hinged upon the hopper without being permanently secured thereto and in such fashion that the center of gravity of the lid may be easily shifted from either of two positions, in one of which the center of gravity causes the lid to rest in its closed position, and in the other of which its open position. The structure further includes provision for the ready removal of the lid from the hopper in order that it may be cleansed.

Other and further objects of the invention will appear as it is described in greater detail in connection with the accompanying drawings, wherein:

Figure 1 is a perspective view of a hopper and lid structure constructed in accordance with this invention;

Figure 2a is a view in vertical section, taken on the plane indicated on the line 2a—2a of Figure 1, and looking in the direction of the arrows;

Figure 2b is a view in side elevation, partly broken away and in section, showing the lid in a position intermediate between its open and closed positions;

Figure 2c is a partial view similar to Figure 2b and showing the lid in a further intermediate position than the position illustrated in Figure 2b, but closer to its open position;

Figure 2d is a view similar to Figure 2b showing the lid in its open position; and Figure 3 is a partial view in section, taken on the line 3—3 of Figure 2a, and looking in the direction of the arrows.

Referring now to the above drawings, the invention is illustrated as being embodied in a hopper indicated generally at 10 in Figure 1, the hopper being formed with a base 11 adapted to be received upon any suitable mixing, agitating, beating, or other form of treating apparatus. The hopper is formed with front and rear walls 12 and 13, respectively, and side walls 14 and 15. The rear wall 13 terminates, at its upper portion, in a vertically extending flange 16 having a rabbet 17 formed therein. The flange 17 continues forwardly from the rear wall and in the upper extremities of the side walls 14 and 15 in the form of flanges 18 and 19. In like manner, the rabbet 17 finds its counterpart in rabbets 20 and 21 in the respective side walls 14 and 15. The top edges of the flanges 18 and 19 slope forwardly, as indicated at 22, and merge into the top edge 23 of the front wall 12.

In order that the hopper 10 may be provided with a closure that may be easily operated, a lid or cover 24 is provided having a forwardly sloping front portion 25, side flanges 26 and 27, and a rear flange 28. In the closed position of the lid the side flanges 26 and 27 are adapted to be received within the rabbets 20 and 21, and the rear flange 28 within the rabbet 17.

Within the lid 24 spaced flanges 29 and 30 are provided, these flanges terminating in downwardly extending arms 31 and 32, respectively. The flanges 29 and 30, and the downwardly extending arms 31 and 32, terminate short of the rear flange 28 of the lid, thus providing an aperture 32' between each flange 29 and 30, and the rear flange 28 of the lid. Longitudinally extending ribs 33 and 34 are formed along the lower portions of the flanges 29 and 30, these ribs continuing forwardly in curved portions 35 and 36 and terminating in downwardly extending rib portions 37 and 38. The arms 31 and 32 are each formed with a reentrant notch or shoulder 39 which serves as a fulcrum or hinge point for the lid, as will be presently described. The lower ends of the arms 31 and 32 are also formed with longitudinally extending flanges 40 and 41 which serve to retain the lid in its fully open position.

The rear wall or flange 16 is formed with recesses 42 and 43 within which the respective flanges 29 and 30 are received. Notches 44 and 45 are formed on the inner and adjacent sides of the respective recesses 42 and 43, these notches serving to receive the ribs 33 and 34, together with their curved counterparts 35 and 36 and their vertically extending extremities 37 and 38, respectively. The respective notches 44 and 45 are formed by means of the respective flanges 46 and 47, these flanges normally engaging the forward portions of the respective flanges 40 and 41 when the lid is in the fully opened position, as illustrated in Figure 2d.

The operation of the foregoing structure depends upon the positioning of the center of gravity of the lid 24 in either of two positions of repose. When the lid is closed, as illustrated in Figures 1, 2a, and 3, the center of gravity causes the lid to remain seated in that position. By pushing the lid rearwardly (accomplished by the application of but a very limited force against either the top or forwardly extending portion of the lid), the center of gravity moves rearwardly until it is beyond the rear wall 13, as illustrated in Figure 2b. In such position the rear portion of the lid falls downwardly and causes the lid to hinge about the bottoms of the notches 42 and 43 which engage the notches 39 of the lid. The curved portions 35 and 36 of the ribs permit this hinging movement to take place without causing the ribs to engage the flanges 46 and 47. This continued swinging or movement of the lid is illustrated in Figure 2c and terminates with the lid in the vertical or open position, as illustrated in Figure 2d, at which time the forwardly extending portions of the flanges 40 and 41 engage the respective flanges 46 and 47 to hold the lid in the position illustrated.

The lid is moved to its closed position by applying a generally horizontal force to the rear of the upper portion of the lid, as a result of which the reverse of the foregoing operation takes place. If, instead of a substantially horizontal force, other forces are applied to the lid to attempt to close it, the lid will either be caused to be removed from the hopper or there will result a binding action at the flanges 46 and 47. In other words, the closing of the lid is accomplished more effectively by a careless operation than by a deliberate one, an advantage greatly to be desired in devices of this kind where the operator may have both hands filled and, without emptying one hand, still close the hopper. From the foregoing it will be seen that the hopper lid may be closed merely by applying a forward longitudinal force to the lid by the back of the hand or wrist.

The dimensioning of the recesses 42 and 43, notches 44 and 45, flanges 40 and 41, and flanges 46 and 47 is such that, when the lid is in the open position, it may be lifted vertically and rotated counterclockwise, as viewed in Figure 2d, resulting in removal of the hopper lid since the flanges 40 and 41 clear the bottoms of the recesses 42 and 43, respectively, when the lid is thus lifted and rotated.

The lid may be made of a fairly elastic material, such as a plastic, if desired, and when it is so made, it can be easily removed from the container body by merely forcing the ribs 33 and 34 out of the notches 44 and 45, respectively. This may be accomplished by lifting the lid on one side thereof. When the lid is constructed in this manner, the aperture 32', between the flanges 29 and 30 and the rear flange 28 of the lid, can be eliminated.

The lid may also be removed, when in the closed position, by merely lifting it in a vertical direction since the ribs 33 and 34 will not be engaged by the flanges 46 and 47 when the lid is so lifted, due to the presence of the aperture 32' between the end of each rib 33 and 34 and the rear flange 28 of the lid. It will be seen that the connection between the lid and hopper is such that the two are secured together sufficiently securely to permit operation of the mechanism and yet without involving a permanent connection in which some movable element is utilized, such as a hinge pin or the like. Moreover, the structure is such as to facilitate the easy removal of the lid when such is desired for cleansing. As hereinabove mentioned, the operation of the lid from closed and open positions is accomplished by means of simple movement and without requiring the grasping of any portion of the lid.

While this invention has been described with specific reference to the accompanying drawings, it is not to be limited save as defined in the appended claims.

We claim:

1. A container and closure therefor comprising a container body having front and rear walls, at least one aperture in the rear wall of the container body, said aperture having a notch in at least one side thereof, and a closure for the container having a flange on the bottom side thereof adapted to be received in said aperture, said flange having a rib thereon adapted to be received in said notch and having a forward portion thereof disposed at an angle to a rearward portion thereof, whereby said closure may be tilted to a substantially vertical position when opened.

2. A device according to claim 1 in which the forward portion of the flange is provided with a stop member.

3. A device according to claim 1 in which the flange terminates short of the rear of the closure.

4. A container and closure therefor comprising a container body having front and rear walls, at least one aperture in the rear wall of the container body, said aperture having a notch in one side thereof, and a closure for the container having a flange on the bottom side thereof adapted to be received in said aperture, said flange having a rib thereon adapted to be received in said notch and having a forward portion thereof disposed substantially 90 degrees to a rearward portion thereof, whereby said closure may be tilted to a substantially vertical position when opened.

5. A container and closure therefor comprising a container body having front and rear walls, a pair of apertures in the rear wall of the container body, said apertures each having a notch in at least one side thereof, and a closure for the container having a pair of flanges on the bottom side thereof adapted to be received in said apertures, said flanges each having a rib thereon adapted to be received in one of said notches and having forward portions thereof disposed at an angle to rearward portions thereof, whereby said closure may be tilted to a substantially vertical position when opened.

6. A device according to claim 5 in which the forward portions of the flanges are provided with stop members.

7. A device according to claim 5 in which the forward portions of the flanges are disposed substantially 90 degrees to the rearward portions thereof.

NEWTON E. SPIESS, JR.
EDWARD M. GROPEN.

References Cited in the file of this patent

UNITED STATES PATENTS

| Number | Name | Date |
|---|---|---|
| 705,672 | Hughes | July 29, 1902 |
| 1,079,981 | Forbes | Dec. 2, 1913 |